United States Patent
Lee et al.

(10) Patent No.: US 9,110,260 B2
(45) Date of Patent: Aug. 18, 2015

(54) HYBRID OPTICAL COUPLING MODULE HAVING AN ALIGNMENT MARK FORMED ON AN OPTICAL TRANSMISSION MEANS AND AN ARRAY LENS AND MANUFACTURING METHOD THEREOF

(71) Applicant: Electronics and Telecommunications Research Institute, Daejeon-si (KR)

(72) Inventors: Joon Ki Lee, Daejeon-si (KR); Sae-Kyoung Kang, Daejeon-si (KR); Joon Young Huh, Daejeon-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 233 days.

(21) Appl. No.: 13/973,202

(22) Filed: Aug. 22, 2013

(65) Prior Publication Data
US 2014/0183344 A1 Jul. 3, 2014

(30) Foreign Application Priority Data
Jan. 2, 2013 (KR) .................. 10-2013-0000303

(51) Int. Cl.
*H01J 3/14* (2006.01)
*G02B 6/42* (2006.01)

(52) U.S. Cl.
CPC ............ *G02B 6/4224* (2013.01); *G02B 6/4214* (2013.01); *G02B 6/4243* (2013.01); *G02B 6/4249* (2013.01); *Y10T 29/4978* (2015.01)

(58) Field of Classification Search
CPC ...... G02B 3/0075; G02B 3/0068; G02B 6/32; G02B 6/43; G02B 6/262; G02B 6/29376
USPC ............... 250/216, 239, 551; 385/11–19, 24, 385/33–37, 47; 359/15–20, 559–561
See application file for complete search history.

(56) References Cited

U.S. PATENT DOCUMENTS

| 5,764,832 A | 6/1998 | Tabuchi |
| 5,972,232 A | 10/1999 | Lee et al. |
| 7,599,587 B2 * | 10/2009 | Nishizawa et al. ............ 385/18 |
| 2012/0114293 A1 | 5/2012 | Choe et al. |

FOREIGN PATENT DOCUMENTS

| KR | 10-0211985 B1 | 8/1999 |
| KR | 2012-0048258 A | 5/2012 |

* cited by examiner

*Primary Examiner* — Que T Le
(74) *Attorney, Agent, or Firm* — Rabin & Berdo, P.C.

(57) ABSTRACT

Provided are a hybrid optical coupling module and a manufacturing method thereof.
The hybrid optical coupling module includes an optical unit configured to include an optical transmission means that transmits an optical signal, and an array lens that is bonded at a point where the optical signal of the optical transmission means is output and focuses the output optical signal, and an electrical unit configured to receive the optical signal focused through the array lens and convert the received optical signal into an electrical signal. Here, an alignment mark is formed on the optical transmission means and the array lens so that the array lens is bonded at the point where the optical signal of the optical transmission means is output.

16 Claims, 12 Drawing Sheets

HYBRID OPTICAL COUPLING MODULE HAVING AN ALIGNMENT MARK FORMED ON AN OPTICAL TRANSMISSION MEANS AND AN ARRAY LENS AND MANUFACTURING METHOD THEREOF

CROSS-REFERENCE TO RELATED APPLICATION

This application claims the benefit under 35 U.S.C. §119 (a) of Korean Patent Application No. 10-2013-0000303, filed on Jan. 2, 2013, the entire disclosure of which is incorporated herein by reference for all purposes.

BACKGROUND

1. Field

The following description relates to a hybrid optical coupling module and a manufacturing method thereof, and more particularly, to a hybrid optical coupling module in which an optical unit for transmitting light and an electrical unit for converting an optical signal into an electrical signal are separately manufactured and then coupled in order to efficiently optically couple the optical unit and the electrical unit, and a manufacturing method thereof.

2. Description of the Related Art

With generalization of mobile devices including smartphones, smart pads, and the like, Internet traffic has continuously increased, and routers, switches, transmission devices, and the like with a high speed and large capacity have been realized so as to efficiently transmit the Internet traffic.

In order to increase the transmission capacity per unit time, a method in which optical signals with different wavelengths are subjected to wavelength division multiplexing (WDM) and transmitted to a single optical fiber in a backbone transmission network has been mainly used since 2000, and even in case of an access network, technologies in which optical signals with different wavelengths are bidirectionally transmitted to a single optical fiber have been commercialized. Even in an Ethernet field, a WDM method or a method in which parallel transmission is performed through a ribbon fiber has been likewise standardized.

In case of 40G Ethernet, a 10G×4 channel coarse wavelength division multiplexing (CWDM) method has been employed as a standard in order to transmit a single mode fiber of 10 km, and in case of 100G Ethernet, a 25G×4 channel local area network (LAN)-WDM method has been employed as a standard in order to transmit single mode fibers of 10 km and 40 km.

An optical transceiver denotes a module that performs optical transmission and reception functions in an optical communication device such as an optical transmission system, a large-capacity router, a switch, or the like which uses an optical fiber as a medium.

In such an optical transceiver module, a structure in which an optical component for performing optical-electric conversion and electric-optical conversion functions is provided and a plurality of optical signals can be simultaneously connected so as to receive signals of a large capacity has been proposed. As an example, in the WDM method, a method of using a planar lightwave circuit (PLC) has been mainly used in order to multiplex (MUX) or demultiplex (DMUX) signals with several wavelengths. In case of a double PLC, arrayed waveguide grating (AWG) may be used or various grating technologies may be used in a silica or silicon-based process.

Since a PLC device is a passive component, a complete product such as an optical receiver module may be obtained only when the PLC device should be coupled with an active component such as a photo diode (PD). Here, the components are made of different materials, and therefore there are difficulties in simultaneously manufacturing the components on a single substrate in the same processing.

Accordingly, the PLC, a light-emitting device (LD: laser diode), and a light-receiving device (PD: photo diode) which have been respectively manufactured in an individual processing should be coupled with each other, which is called hybrid integration.

Figure 1:
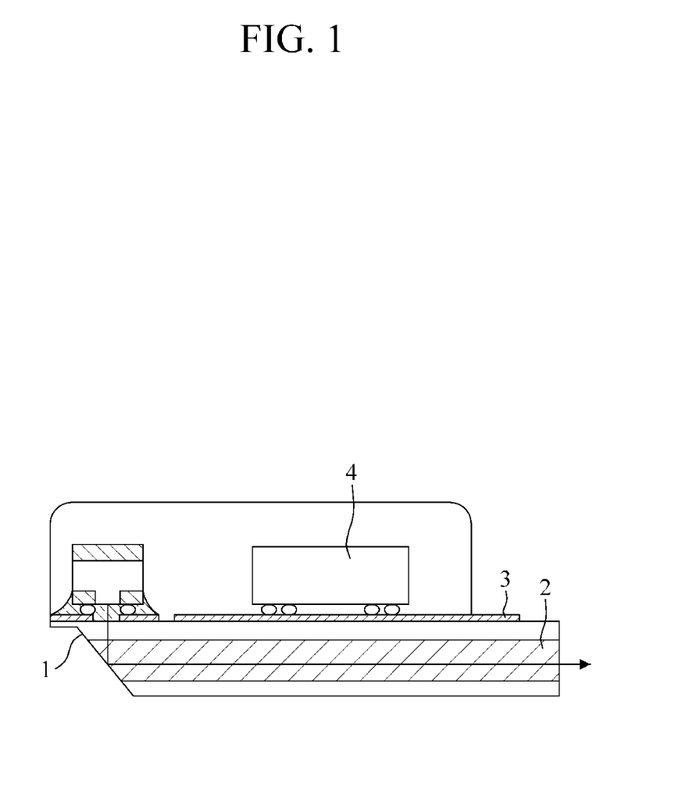
FIG. 1 is a cross-sectional view showing a structure of a conventional vertical optical coupling module.

As a method of coupling the PLC and the PD, a butt coupling method of directly coupling light emitted from a core of the PLC or a method of coupling light by reflecting a path of light at an angle of 90° using a mirror surface 1 with an angle of 45° as shown in FIG. 1 is widely used.

An existing 90° reflection coupling method has a structure in which a PD is mounted on a PLC 2 or a mounting board 3 is put on the PLC 2, and the PD and a transimpedance amplifier (TIA) are sequentially disposed, and therefore there are disadvantages in that a corresponding test may be performed only after all components 4 are assembled and the components should be thrown out in their entirety when a defect occurs, resulting in degradation in mass-productivity. In particular, a defect is more likely to occur when a large number of channels are used, and the components should be thrown out in their entirety when even only one channel improperly operates.

In addition, an active area of a PD that detects light becomes smaller at a higher speed, and therefore coupling efficiency is degraded as a distance between a reflection surface 1 of the PLC 2 and the active area of the PD becomes longer.

SUMMARY

The following description relates to a hybrid optical coupling module which has a structure in which an optical unit that is formed by bonding an array lens to an optical transmission means and an electrical unit that mounts a photo diode (PD) an a transimpedance amplifier (TIA) on a substrate may be independently manufactured, tested, and then actively aligned to thereby reduce a defective rate, and a manufacturing method thereof. In addition, only one of the optical unit and the electrical unit may be discarded even when a defect occurs, thereby reducing production costs, and the array lens may be integrally bonded to the optical transmission means, thereby facilitating focusing of light in an active area of the PD and reducing a loss rate.

In one general aspect, a hybrid optical coupling module includes: an optical unit configured to include an optical transmission means that transmits an optical signal, and an array lens that is bonded at a point where the optical signal of the optical transmission means is output and focuses the output optical signal; and an electrical unit configured to receive the optical signal focused through the array lens and convert the received optical signal into an electrical signal, wherein an alignment mark is formed on the optical transmission means and the array lens so that the array lens is bonded at the point where the optical signal of the optical transmission means is output.

In another general aspect, a manufacturing method of a hybrid optical coupling module which includes an optical unit configured to include an optical transmission means that transmits an optical signal and an array lens that is bonded at a point where the optical signal of the optical transmission means is output and focuses the output optical signal, and an electrical unit configured to receive the optical signal focused through the array lens and convert the received optical signal into an electrical signal, the manufacturing method includes: forming an alignment mark on the optical transmission means and the array lens; forming the optical unit by bonding the optical transmission means and the array lens in accordance with the alignment mark; forming an inclined surface on one side of the optical transmission means; forming a reflection layer by applying high reflection coating to the inclined surface; and actively aligning the optical unit in which the reflection layer is formed and the electrical unit.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
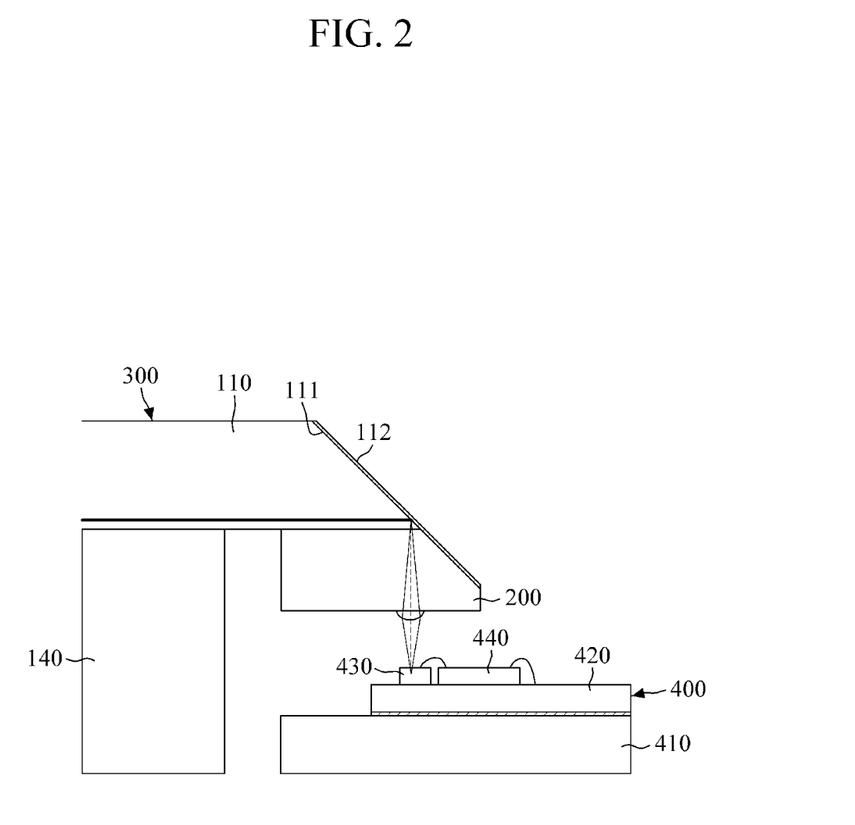
FIG. 2 is a cross-sectional view showing a hybrid optical coupling module according to an embodiment of the present invention.
Figure 6:
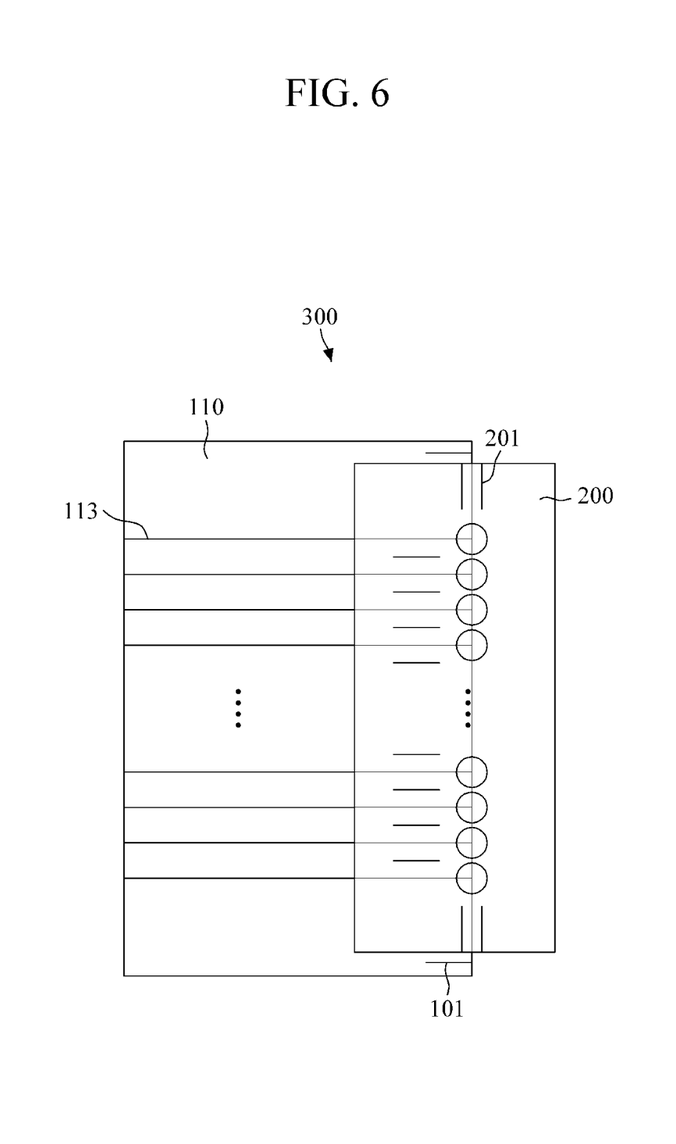
FIG. 6 is a plan view showing an optical unit of FIG. 2.

FIG. 2 is a cross-sectional view showing a hybrid optical coupling module according to an embodiment of the present invention, and FIG. 6 is a plan view showing an optical unit of FIG. 2. As shown in FIGS. 2 and 6, the hybrid optical coupling module according to an embodiment of the present invention includes an optical unit 300 to include an optical transmission means that transmits an optical signal and an array lens 200 that is bonded at a point where the optical signal of the optical transmission means is output and focuses the output optical signal, and an electrical unit 400 to receive the optical signal focused through the array lens 200 and convert the received optical signal into an electrical signal. Here, alignment marks 101 and 201 are formed on the optical transmission means and the array lens 200 so that the array lens 200 is accurately bonded at the point where the optical signal of the optical transmission means is output.

In general, a component for converting an optical signal into an electrical signal in an optical transceiver module is called a receiver optical sub-assembly (ROSA). As a parallel transmission method is increasingly used along with an increase in the speed of optical communication, an optical fiber array using a planar lightwave circuit (PLC) in which an optical output is established in the form of multi-core process or a V-groove of a silicon optical bench (SiOB) is widely used in the ROSA module.

The optical signal output from the PLC or the optical fiber is converted into the electrical signal through a photo diode (PD) to amplify an output current of the PD through a transimpedance amplifier (TIA) and then converted into a voltage. Here, it is necessary that coupling is efficiently performed in an active area of the PD so that the optical signal is converted into the electrical signal.

As shown in FIG. 2, the hybrid optical coupling module according to an embodiment of the present invention is composed of the optical unit 300 and the electrical unit 400. The optical unit 300 includes the optical transmission means and the array lens 200 for focusing an optical signal output from the optical transmission means, and the electrical unit 400 receives the optical signal focused through the array lens 200 and converts the received optical signal into an electrical signal.

Figure 7:
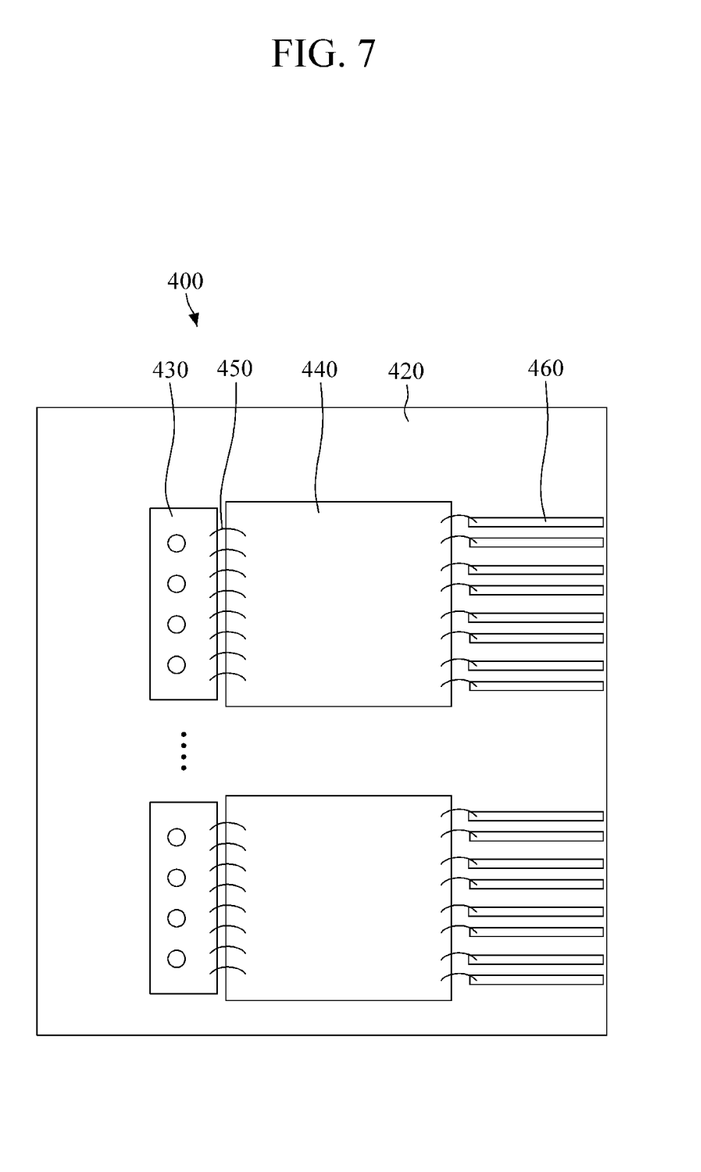
FIG. 7 is a plan view showing an electrical unit of FIG. 1.

FIG. 7 is a plan view showing an electrical unit of FIG. 1.

According to an embodiment of the present invention, the electrical unit 400 includes a sub-mount 410, a substrate 420 which is mounted on the sub-mount 410, and a PD 430 and a TIA 440 which are mounted on the substrate 420 and are subjected to wire-bonding 450.

When a large number of channels are provided, the substrate 420 may be divided into a plurality of substrates, and the TIA 440 may be subjected to a wire-bonding process with a pattern 460 formed on the substrate 420 for the purpose of high-speed transmission of electrical signals.

As described above, in the present invention, the optical unit 300 and the electrical unit 400 are physically separated, and therefore they may be independently manufactured, tested, and then coupled on a single metal plate through active alignment. As a result, the overall defective rate may be reduced.

Figure 8:
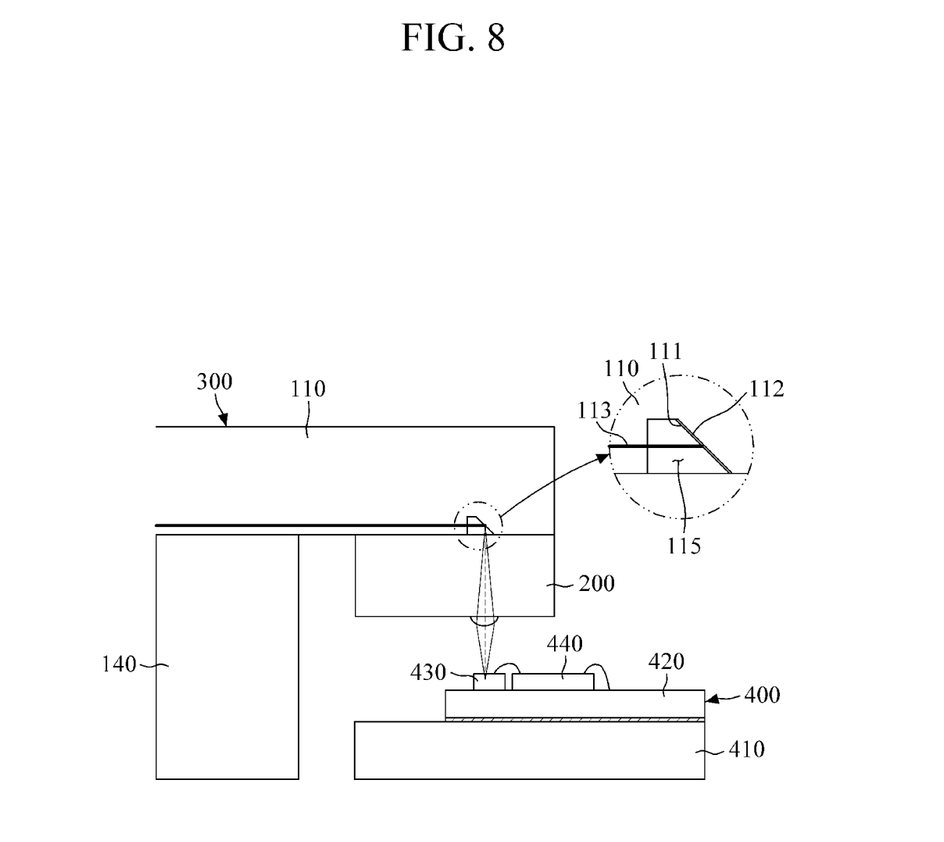
FIG. 8 is a cross-sectional view showing a hybrid optical coupling module according to another embodiment of the present invention.
Figure 10:
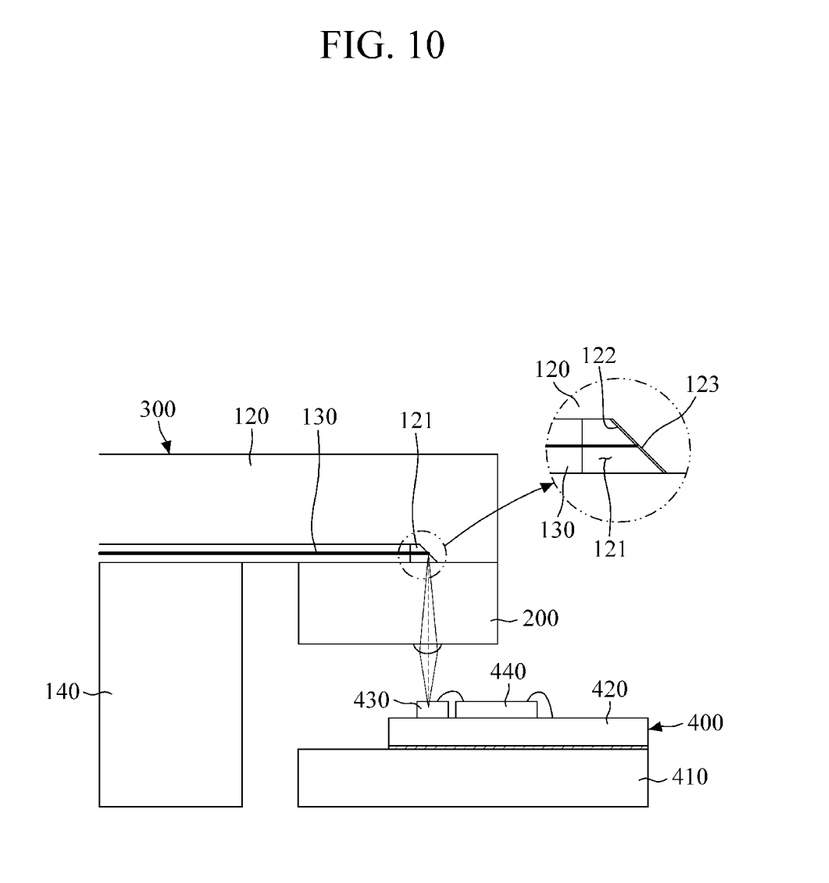
FIG. 10 is a cross-sectional view showing a hybrid optical coupling module according to still another embodiment of the present invention.

FIG. 8 is a cross-sectional view showing a hybrid optical coupling module according to another embodiment of the present invention, and FIG. 10 is a cross-sectional view showing a hybrid optical coupling module according to still another embodiment of the present invention.

The optical transmission means may be provided in various known types that transmit the optical signal as shown in FIGS. 8 and 10, and mounted on a separate sub-mount 140.

As an example, the optical transmission means may include a multi-core type of a planar lightwave circuit (PLC) 110. In addition, according to another example, the optical transmission means may include a silicon optical bench (SiOB) 120 in which a V-groove 121 is formed and an optical fiber 130 that is inserted into the V-groove 121 and fixed by epoxy.

A case in which the optical transmission means is the PLC 110 will be described as below.

As shown in FIG. 6, in the optical unit 300 according to an embodiment of the present invention, the alignment marks 101 and 201 are respectively formed on the PLC 110 and the array lens 200 so that a center of the array lens 200 can be placed at a point where light transmitted through a core 113 of the PLC 110 is output.

A variety of shapes of the alignment marks 101 and 201 may be provided. By forming the alignment marks 101 and 201, the array lens 200 may be bonded to the PLC 110 in a fixed position.

According to an embodiment of the present invention, the optical transmission means and the array lens 200 may be bonded with each other using an epoxy-based adhesive.

Figure 3:
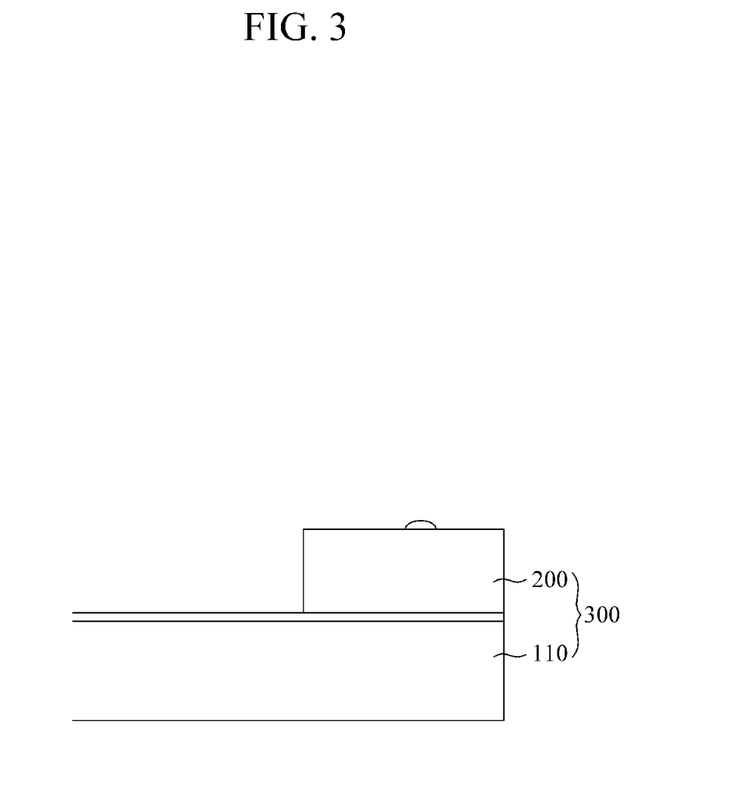
FIG. 3 is a diagram showing a state in which an optical transmission means and an array lens are bonded with each other.
Figure 4:
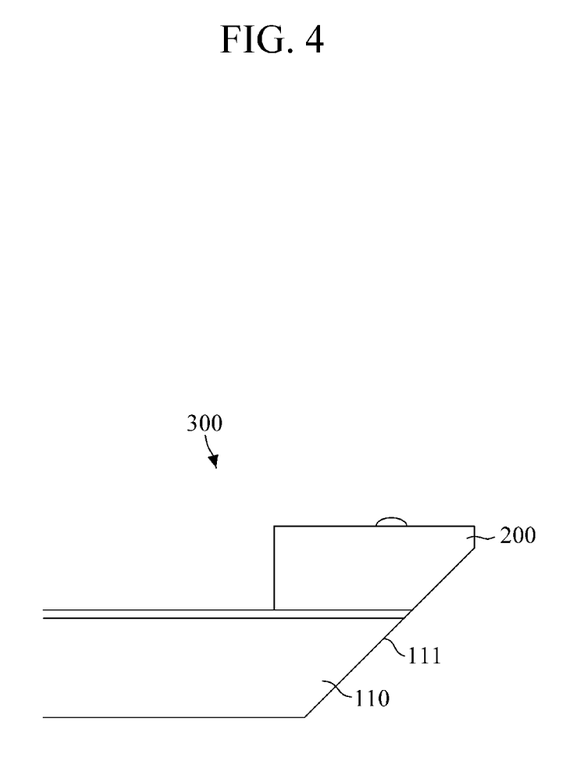
FIG. 4 is a diagram showing a state in which an inclined surface is formed on the bonded optical transmission means and array lens.
Figure 5:
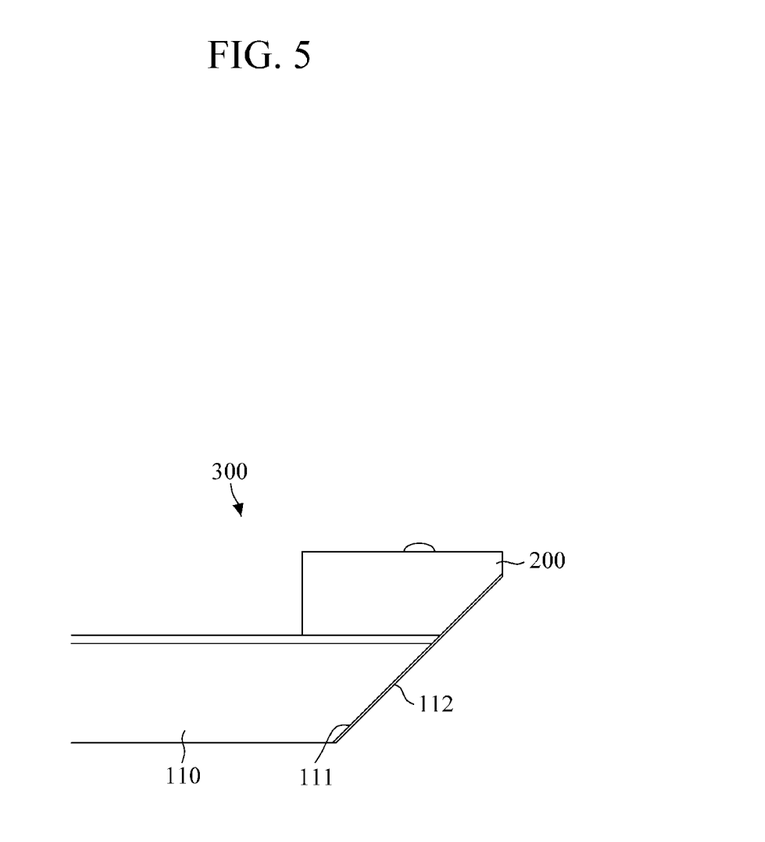
FIG. 5 is a diagram showing a state in which a reflection layer is formed on the inclined surface of FIG. 4.

Meanwhile, FIG. 3 is a diagram showing a state in which an optical transmission means and an array lens are bonded with each other, FIG. 4 is a diagram showing a state in which an inclined surface is formed on the bonded optical transmission means and array lens, and FIG. 5 is a diagram showing a state in which a reflection layer is formed on the inclined surface of FIG. 4.

According to an embodiment of the present invention, an inclined surface 111 is formed on the whole or a part of one side end of the PLC 110, a reflection layer 112 for vertically reflecting an optical signal is formed on the inclined surface 111, and the array lens 200 is bonded at a point where the optical signal reflected by the reflection layer 112 is output.

The inclined surface 111 may be formed at an angle of 45 degrees with respect to the alignment marks 101 and 201 formed on the PLC 110 or the array lens 200, and formed through polishing or etching. High reflection (HR) coating is applied to the inclined surface 111 formed in the above-described method, thereby forming the reflection layer 112 by which the optical signal is reflected.

The angle of the inclined surface 111 is most desirably 45 degrees, but not limited to 45 degrees because it is difficult to accurately polish the inclined surface 111 in the actual implementation.

FIG. 8 is a cross-sectional view showing a hybrid optical coupling module according to another embodiment of the present invention.

In FIG. 8, instead of polishing the PLC 100 and the entire array lens 200 at the angle of 45 degrees, a concave space 115 is formed in a part of the PLC 110 where light of the core 113 is output through an etching process, the inclined surface 111 having an angle of 45 degrees is formed in an end of the concave space 115, and the reflection layer 112 is formed on the inclined surface 111.

Figure 9:
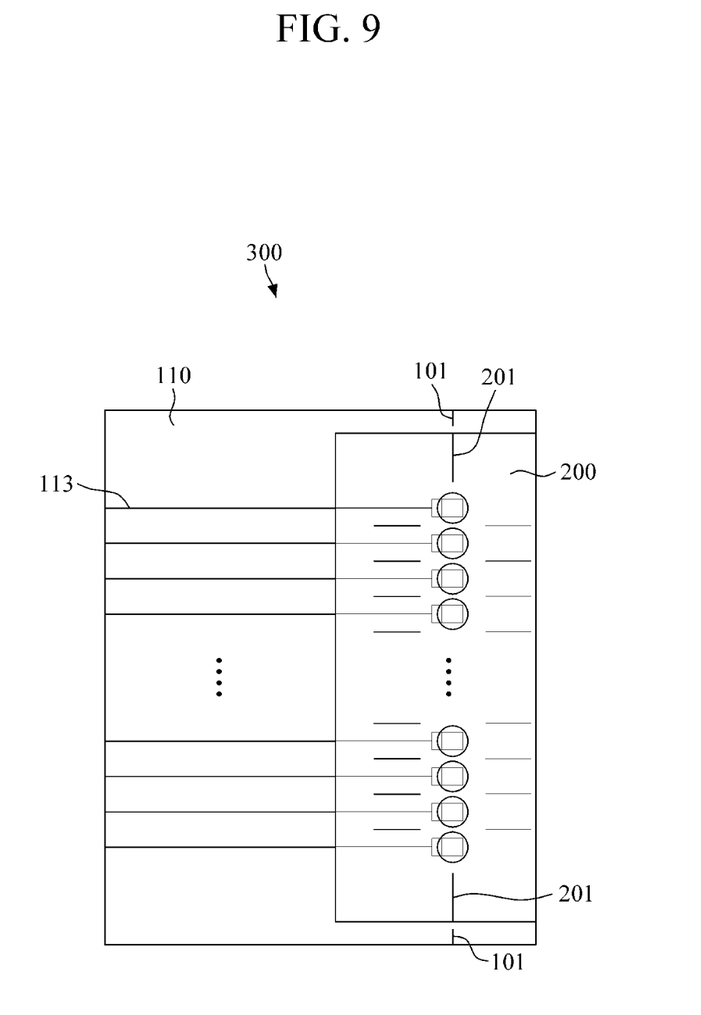
FIG. 9 is a plan view showing an optical unit shown in FIG. 8.

Meanwhile, as shown in FIG. 9, in the optical unit 300, the reflection layer 112 is formed on the inclined surface 111 formed in the PLC 110 so that a point where light is reflected is placed at a center of the array lens 200, and then the alignment mark 101 is formed.

In the same manner, the alignment mark 201 is formed in the array lens 200. With respect to the alignment marks 101 and 201 formed on the PLC 110 and the array lens 200, the PLC 110 and the array lens 200 may be bonded with each other in a fixed position.

FIG. 10 is a cross-sectional view showing a hybrid optical coupling module according to still another embodiment of the present invention.

In FIG. 10, a case in which the optical transmission means includes the silicon optical bench 120 in which the V-groove 121 is formed and the optical fiber 130 inserted into the V-groove 121 and fixed by epoxy will be described.

According to the present embodiment, an inclined surface 122 is formed on one side surface of the V-groove 121, a reflection layer 123 for vertically reflecting an optical signal is formed on the inclined surface 122, and the array lens 200 is bonded at a point where an optical signal reflected by the reflection layer 123 is output.

Figure 11:
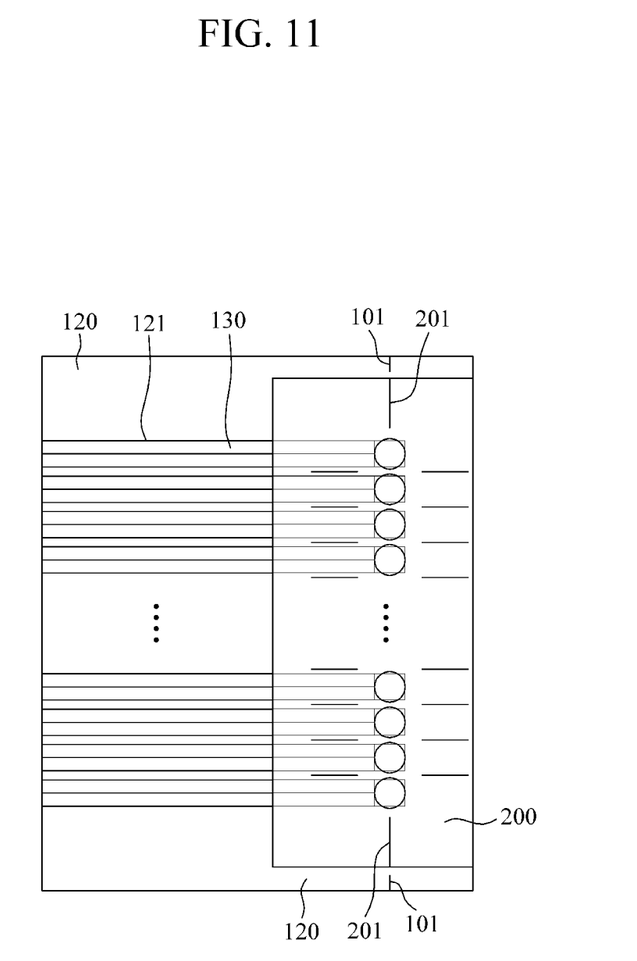
FIG. 11 is a plan view showing an optical unit shown in FIG. 10.

FIG. 11 is a plan view showing an optical unit shown in FIG. 10.

Specifically, referring to FIG. 11, the inclined surface 122 is formed on one side surface of the V-groove 121 so that a point where light output from the optical fiber 130 inserted into the V-groove 121 of the silicon optical bench 120 is reflected is placed at a center of the array lens 200, the reflection layer 123 is formed on the inclined surface 122, and then the alignment mark 101 is formed.

Next, the optical fiber 130 is disposed in the V-groove 121 so that an end of the optical fiber 130 moves in front of the reflection layer 123 and fixed using epoxy. In the same manner, since the alignment mark 201 is also formed on the array lens 200, the array lens 200 may be bonded to the silicon optical bench 120 with respect to the alignment marks 101 and 201 of the array lens 200 and the silicon optical bench 120.

According to an embodiment of the present invention, a bonding surface between the optical transmission means and the array lens 200 is subjected to anti-reflection (AR) coating treatment so as to reduce a loss of light.

In addition, a surface on which light of the array lens 200 is output may be additionally subjected to AR coating treatment so as to reduce a loss of the light.

Figure 12:
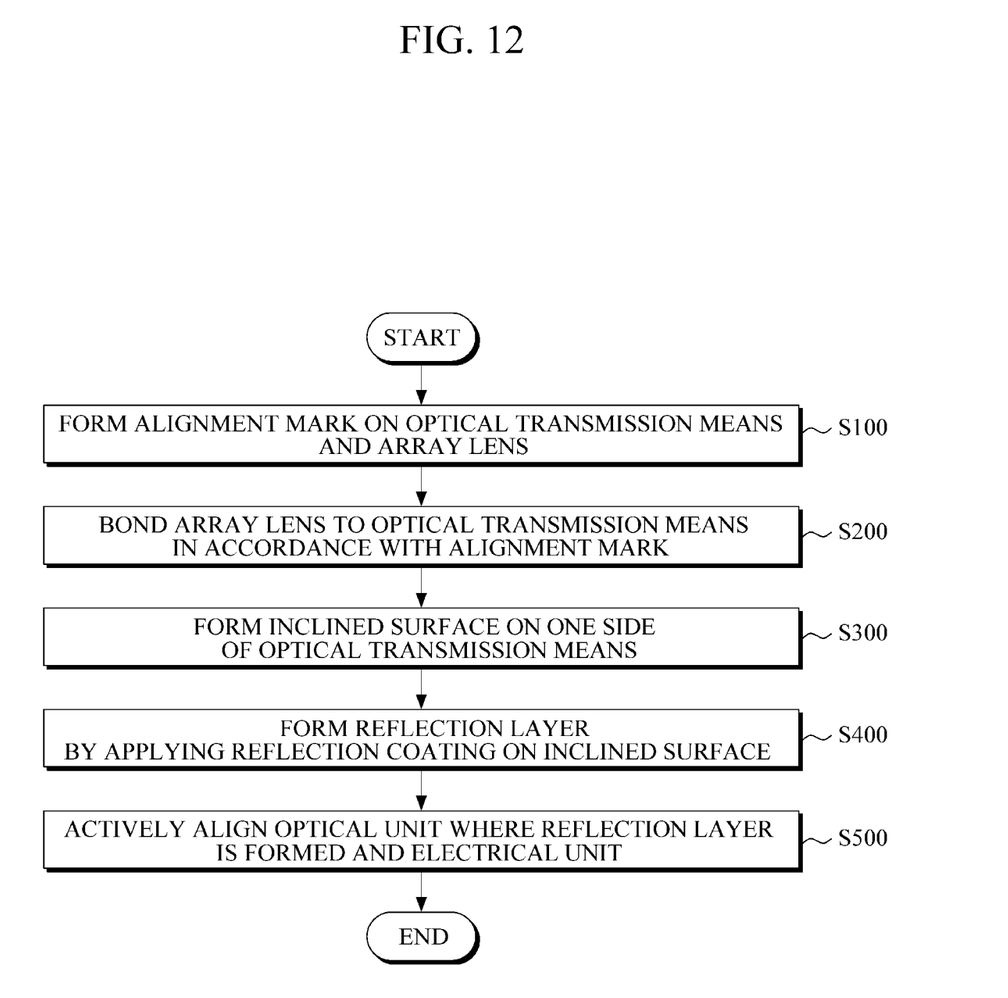
FIG. 12 is a flowchart showing a manufacturing method of a hybrid optical coupling module according to an embodiment of the present invention.

FIG. 12 is a flowchart showing a manufacturing method of a hybrid optical coupling module according to an embodiment of the present invention.

The manufacturing method of the hybrid optical coupling module according to an embodiment of the present invention includes operation 100 of forming alignment marks 101 and 201 on the optical transmission means and the array lens 200, operation 200 of forming the optical unit 300 by bonding the array lens 200 to the optical transmission means in accordance with the alignment marks 101 and 201, operation 300 of forming inclined surfaces 111 and 122 on one side of the optical transmission means through polishing or etching, operation 400 of forming reflection layers 112 and 123 by applying high reflection (HR) coating to the inclined surfaces 111 and 122, and operation 500 of actively aligning the optical unit 300 in which the reflection layers 112 and 123 are formed and the electrical unit 400.

Before specific descriptions of the manufacturing method of the hybrid optical coupling module according to an embodiment of the present invention, detailed descriptions applied in the same manner as that of the above-described hybrid optical coupling module will be omitted, and it is noted that the descriptions of the manufacturing method will be understood with reference to the descriptions of the hybrid optical coupling module.

The hybrid optical coupling module used in the present invention includes the optical unit 300 to include the optical transmission means that transmits an optical signal and the array lens 200 that is bonded at a point where the optical signal of the optical transmission means is output and focuses the output optical signal, and the electrical unit 400 to receive the optical signal focused through the array lens 200 and convert the received optical signal into an electrical signal.

In operation 100, the alignment marks 101 and 201 are formed on the optical transmission means and the array lens 200. The optical transmission means may be provided in various known types that transmit the optical signal, but as an example, may include a multi-core type of PLC 110.

In addition, as another example, the optical transmission means may include the silicon optical bench 120 in which the V-groove 121 is formed and the optical fiber 130 inserted into the V-groove 121 and fixed by epoxy. A variety of shapes of the alignment marks 101 and 201 may be provided.

In operation 200, the optical unit 300 is formed by bonding the array lens 200 to the optical transmission means in accordance with the alignment marks 101 and 201. By forming the alignment marks 101 and 201, the PLC 110 or the silicon optical bench 120 with the array lens 200 may be bonded with each other in a fixed position. According to an embodiment of the present invention, in operation 200, the optical transmission means and the array lens 200 may be bonded with each other by an epoxy-based adhesive.

In operation 300, the inclined surfaces 111 and 122 are formed on one side of the optical transmission means through polishing or etching. When the optical transmission means is the multi-core type of the PLC 110, the inclined surface is formed on one side end of the PLC 110 through polishing or etching, and when the optical transmission means includes the silicon optical bench 120 in which the V-groove 121 is formed and the optical fiber 130 inserted into the V-groove 121 and fixed by epoxy, the inclined surface 122 is formed on one side of the V-groove 121 through etching.

In operation 400, the reflection layers 112 and 123 are formed by applying HR coating to the inclined surfaces 111 and 122. The reflection layers 112 and 123 convert a path of the optical signal by reflecting the optical signal output from the optical transmission means.

In operation 500, the optical unit 300 in which the reflection layers 112 and 123 are formed and the electrical unit 400 are actively aligned.

According to an embodiment, the substrate 420 is mounted on the sub-mount 410, a light receiving element 430 (PD: photo diode) and a preamplifier 440 (TIA: transimpedance amplifier) are mounted on the substrate 420, and then wire-bonding is performed between the light receiving element 430 and the preamplifier 440 and between the preamplifier 440 and the substrate 420.

As described above, according to the embodiments of the present invention, since the optical unit 300 and the electrical unit 400 are physically separated, the optical unit 300 and the electrical unit 400 may be independently manufactured, tested, and then bonded with each other on a single metal plate through active alignment, thereby reducing the overall detective rate.

In addition, according to the embodiments of the present invention, in the hybrid optical coupling module and the manufacturing method thereof, the optical unit formed in such a manner that the array lens is bonded to the optical transmission means such as an optical fiber or a PLC and an inclined reflection layer is formed on the optical transmission means and the electrical unit in which a PD and a TIA are mounted on the substrate may be independently manufactured, tested, and then actively aligned, thereby reducing a detective rate.

In addition, only one of the optical unit and the electrical unit may be discarded even when a defect occurs, thereby reducing production costs, and the array lens may be integrally bonded to the optical transmission means, thereby facilitating focusing of light in an active area of the PD and reducing a loss rate.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A hybrid optical coupling module comprising:
    an optical unit configured to include an optical transmission means that transmits an optical signal, and an array lens that is bonded at a point where the optical signal of the optical transmission means is output and focuses the output optical signal; and
    an electrical unit configured to receive the optical signal focused through the array lens and convert the received optical signal into an electrical signal,
    wherein an alignment mark is formed on the optical transmission means and the array lens so that the array lens is bonded at the point where the optical signal of the optical transmission means is output.

2. The hybrid optical coupling module of claim 1, wherein the optical transmission means includes a multi-core type of planar lightwave circuit (PLC).

3. The hybrid optical coupling module of claim 1, wherein the optical transmission means includes a silicon optical bench (SiOB) in which a V-groove is formed and an optical fiber inserted into the V-groove and fixed by epoxy.

4. The hybrid optical coupling module of claim 1, wherein the optical transmission means and the array lens are bonded by epoxy.

5. The hybrid optical coupling module of claim 2, wherein an inclined surface is formed on one end of the PLC, a reflection layer for vertically reflecting an optical signal is formed on the inclined surface, and the array lens is bonded at a point where an optical signal reflected by the reflection layer is output.

6. The hybrid optical coupling module of claim 3, wherein an inclined surface is formed on one side surface of the V-groove, a reflection layer for vertically reflecting an optical signal is formed on the inclined surface, and the array lens is bonded at a point where an optical signal reflected by the reflection layer is output.

7. The hybrid optical coupling module of claim 1, wherein the electrical unit includes a sub-mount, a substrate mounted on the sub-mount, a light receiving element (PD: photo diode) mounted on the substrate, and a preamplifier (TIA: transimpedance amplifier).

8. The hybrid optical coupling module of claim 1, wherein a bonding surface between the optical transmission means and the array lens is subjected to anti-reflection (AR) coating treatment so as to reduce a loss of light.

9. The hybrid optical coupling module of claim 1, wherein a surface from which light of the array lens is output is subjected to an AR coating treatment so as to reduce a loss of light.

10. A manufacturing method of a hybrid optical coupling module which includes an optical unit configured to include an optical transmission means that transmits an optical signal and an array lens that is bonded at a point where the optical signal of the optical transmission means is output and focuses the output optical signal, and an electrical unit configured to receive the optical signal focused through the array lens and convert the received optical signal into an electrical signal, the manufacturing method comprising:
    forming an alignment mark on the optical transmission means and the array lens;

forming the optical unit by bonding the optical transmission means and the array lens in accordance with the alignment mark;

forming an inclined surface on one side of the optical transmission means;

forming a reflection layer by applying high reflection coating to the inclined surface; and actively aligning the optical unit in which the reflection layer is formed and the electrical unit.

11. The manufacturing method of claim 10, wherein the optical transmission means includes a multi-core type of PLC, and the inclined surface is formed on one end of the PLC.

12. The manufacturing method of claim 10, wherein the optical transmission means includes a silicon optical bench (SiOB) in which a V-groove is formed and an optical fiber inserted into the V-groove and fixed by epoxy, and the inclined surface is formed on one side surface of the V-groove.

13. The manufacturing method of claim 10, wherein the electrical unit mounts a substrate on a sub-mount, mounts a light receiving element (PD) and a preamplifier (TIA) on the substrate, and then performs wire-bonding between the light receiving element and the preamplifier and between the preamplifier and the substrate.

14. The manufacturing method of claim 10, wherein the optical transmission means and the array lens are bonded by an epoxy-based adhesive.

15. The manufacturing method of claim 11, wherein the inclined surface is formed by polishing one side end of the PLC.

16. The manufacturing method of claim 12, wherein the inclined surface is formed by etching one side surface of the V-groove.

* * * * *